(12) United States Patent
Hayashi et al.

(10) Patent No.: US 7,635,118 B2
(45) Date of Patent: Dec. 22, 2009

(54) CYLINDRICAL DYNAMIC DAMPER

(75) Inventors: Takashi Hayashi, Kasugai (JP); Naohito Kuwayama, Nagoya (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 345 days.

(21) Appl. No.: 11/319,060

(22) Filed: Dec. 28, 2005

(65) Prior Publication Data
US 2006/0157903 A1 Jul. 20, 2006

(30) Foreign Application Priority Data
Jan. 20, 2005 (JP) .............................. 2005-013171

(51) Int. Cl.
*F16F 7/00* (2006.01)
*F16M 13/00* (2006.01)

(52) U.S. Cl. ................................. 267/141.7; 267/141.2

(58) Field of Classification Search ................. 267/141, 267/141.1, 141.2, 141.3, 141.4, 141.7
See application file for complete search history.

(56) References Cited

U.S. PATENT DOCUMENTS 6,450,487 B1  9/2002  Kuwayama ................. 267/141
6,550,754 B2 *  4/2003  Kuwayama ............... 267/141.5
6,817,599 B2 * 11/2004  Kato et al. ................ 267/141.2
6,857,623 B2 *  2/2005  Kuwayama ............... 267/141.3
6,981,579 B2 *  1/2006  Kuwayama et al. ......... 188/379
2003/0006541 A1 *  1/2003  Kuwayama ................ 267/141
2004/0041318 A1 *  3/2004  Kuwayama et al. ...... 267/141.2

FOREIGN PATENT DOCUMENTS

EP  1 191 252 A2  3/2002
JP  A 9-89047  3/1997
JP  A 2002-98193  4/2002
JP  A 2004-92674  3/2004

* cited by examiner

*Primary Examiner*—Melody M Burch
(74) *Attorney, Agent, or Firm*—Oliff & Beridge, PLC

(57) ABSTRACT

A cylindrical dynamic damper including: a cylindrical mass member disposed about a rotating shaft and coaxially therewith; and a pair of elastic support members having a pair of ring-shaped affixing members situated at axial ends of the mass member and mounted on an outside peripheral face of the rotating shaft and a pair of elastic support portions of cylindrical shape connecting respectively to the affixing members and to the axial ends of the mass member to thereby elastically support the mass member. The mass member has on inside peripheral corners of both axial ends slanted faces disposed in chamfered profile and varying in shape in the circumferential direction; and the elastic support portions connected at one ends to the slanted faces have free length varying in the circumferential direction.

7 Claims, 7 Drawing Sheets

CYLINDRICAL DYNAMIC DAMPER

INCORPORATED BY REFERENCE

The disclosure of Japanese Patent Application No. 2005-013171 filed on Jan. 20, 2005 including the specification, drawings and abstract is incorporated herein by reference in its entirety.

BACKGROUND OF THE INVENTION

1. Field of the Invention

The present invention relates to a cylindrical dynamic damper intended for mounting on a rotating shaft, such as an automobile drive shaft or a propeller shaft for example, in order to suppress detrimental vibration produced by the rotating shaft.

2. Description of the Related Art

The rotating shafts, such as an automobile drive shaft or a propeller shaft, may experience undesired detrimental vibration such as bending vibration or twisting vibration due to rotational unbalance produced in association with rotation thereof. In order to suppress such detrimental vibration, dynamic dampers of various kinds are employed. A dynamic damper achieves its function by means of matching its resonance frequency (natural frequency) to the predominant frequency of the detrimental vibration produced by the rotating shaft. With this arrangement, the vibrational energy of the rotating shaft is absorbed by being converted to vibrational energy of the dynamic damper.

JP-A-2004-92674, JP-A-9-89047 and JP-A-2002-98193 (hereinafter referred to as "Citations 1, 2 and 3", respectively) teach examples of such dynamic dampers, each comprising: a cylindrical mass member disposed spaced a distance apart from an outside periphery of a rotating shaft in a coaxially fashion; and a pair of rubber elastic support members. The pair of rubber elastic support members includes a pair of ring-shaped affixing members situated at axial ends of the mass member and mounted on the outside peripheral face of the rotating shaft, and a pair of elastic support portions of tapered cylindrical shape connecting respectively to the affixing members and to the axial ends of the mass member to thereby elastically support the mass member on the rotating shaft.

Citations 1 and 2 teach that the rubber elastic support members are imparted with variable wall thickness and axial length to form high spring parts whose spring constant in the axial direction is higher than a certain value and low spring parts whose spring constant is lower than the aforementioned certain value. These high spring parts and low spring parts are situated in alternating fashion in the circumferential direction. Citation 1 also teaches that at the axial ends of the mass member, a recessed end face recessed axially inward and connected to a first end of a low spring part, and a convex end face located axially outward from the recessed end face and connected to a first end of a high spring part are formed in alternating fashion in the circumferential direction. With this arrangement, the dynamic dampers taught in Citations 1 and 2 can set a plurality of resonance frequencies thereof over a wide range, bridging a single target resonance frequency of the rotating shaft. This makes it possible to hold to a minimum the drop in vibration damping action produced by variability in the resonance frequency of the rotating shaft and of the cylindrical dynamic damper. The resonance frequency of a cylindrical dynamic damper is basically determined by the mass of the mass member and the spring constant of the rubber elastic support members in the axis-perpendicular direction.

Citation 3 discloses an arrangement wherein, at the inside peripheral corners at the axial ends of the mass member, a slanted face that extends in a chamfered profile along the axial end face and the inside peripheral face of the mass member is formed in a continuous tapered cylindrical configuration about the circumference, with one axial end of the rubber elastic support member affixed to the slanted face. This arrangement makes it possible for the rubber elastic support member to be shifted and positioned axially inward, thus assuring adequate effective length of the rubber elastic support member, while minimizing the distance over which the mass member projects in the axial direction from the axial end face in the rubber elastic support member. Thus, it is possible to achieve both sufficient mass on the part of the mass member, and compact size.

It is known that rotating shafts, such as the drive shaft installed in an automobile, can experience detrimental vibration due to vibration transmitted via the wheels. Thus, when tuning the resonance frequency of a dynamic damper installed on the rotating shaft, the resonance frequency (natural frequency) of the wheels must be taken into consideration. However, wheels commonly used can be generally divided into steel ones and aluminum ones, and the resonance frequency of steel wheels is appreciably different from the resonance frequency of aluminum wheels, with the resonance frequency of aluminum wheels being about 1.5 time or more that of steel wheels.

Thus, in the cylindrical dynamic dampers of the type taught in Citations 1 and 2, the high spring portions and the low spring portions of the rubber elastic support members are designed to support the mass member. Accordingly, if it attempted to tune the damper to the two resonance frequencies of steel wheels and aluminum wheels, even if the thickness and free length of these portions are adjusted to the maximum possible extent, the ability to effect tuning such that the resonance frequency on the high frequency end is about 1.5 times the resonance frequency on the low frequency end is limited.

In a dynamic damper having a construction in which the axial ends of the mass member are elastically supported by a pair of rubber elastic support members, stress tends to become concentrated in areas where the rubber elastic support members are connected to the mass member. Further, the additional stress concentration may be produced due to the presence of edge portions (inside peripheral corners) of the mass member in these connection areas, posing the risk of difficulty in ensuring adequate durability of the rubber elastic support members. With respect to this point, Citation 1 shows that a recessed end face and a convex end face disposed in alternating fashion in the circumferential direction are formed in a stepped configuration in the axial direction on the two axial ends of the mass member, thereby creating a large spring ratio between the high spring parts and the low spring parts. With this arrangement, the step between the recessed end face and the convex end face tends to become rather large, which is disadvantageous in terms of assuring adequate durability.

SUMMARY OF THE INVENTION

It is therefore one object of this invention to provide a cylindrical dynamic damper able to be tuned to two different resonance frequencies further apart from one another, while advantageously ensuring good durability.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provide a cylindrical dynamic damper adapted to be installed on a rotating shaft, comprising: a cylindrical mass member disposed radially outwardly spaced away from an outside periphery of the rotating shaft and coaxially therewith; and a pair of rubber elastic support members having a pair of ring-shaped affixing members situated at axial ends of the mass member and adapted to be mounted on an outside peripheral face of the rotating shaft and a pair of elastic support portions of cylindrical shape connecting respectively to the affixing members and to the axial ends of the mass member to thereby elastically support the mass member, wherein the mass member has on inside peripheral corners of both axial ends slanted faces disposed in chamfered profile and varying in shape in the circumferential direction; and the elastic support portions connected at one ends to the slanted faces have free length varying in the circumferential direction.

In the cylindrical dynamic damper of the present invention, the inside peripheral corners at both axial ends of the mass member have slanted faces that vary in shape in the circumferential direction, while each of the elastic support members, one end of which is connected to the slanted face, has free length that varies in the circumferential direction. By desirably varying the shape of the slanted faces of the mass member, it becomes possible to establish a largest spring ratio in the axis-perpendicular direction, between the portion of the elastic support member having maximum free length and the portion having minimum free length. It is accordingly possible to tune the damper to two different resonance frequencies that are further apart. It should be appreciated that the slanted faces should be interpreted to mean cutout faces or any other faces formed on the inside peripheral corners of both axial ends of the mass member.

Preferably, the slanted faces of the mass member vary gradually in shape in the circumferential direction, so that the free length of the each elastic support member connecting at one end to the sloping face varies gradually in stepless fashion in the circumferential direction. This preferred arrangement permits for the elastic support member to vary extremely smoothly in terms of the free length, effectively avoiding local stress concentration in the rubber elastic support member.

In the cylindrical dynamic damper of the present invention, the axially inward ends of the rubber elastic support members, at which stress concentration tends to occur during load input, connect to the slanted faces formed with a chamfered profile on the inside peripheral corners at the axial ends of the mass member, whereby stress concentration in the rubber elastic support member is alleviated, preventing the occurrence of cracking or the like, so that durability is advantageously ensured.

In the present invention, the mass member is formed with a cylindrical shape having a certain mass, selected in relation to the spring constant of the elastic support portion of the rubber elastic support member in the axis-perpendicular direction. The mass member has a constant axial length on the outside peripheral portion all the way in the circumference thereof. Iron alloy with high specific gravity is favorably employed for forming the mass member, which can advantageously be formed of pipe, cast metal, forged metal, or the like. The slanted face produced on the inside peripheral corner at each axial end of the mass member is formed with a chamfered profile across the end face and inside peripheral face of the mass member, with shape that varies gradually in the circumferential direction. The formation of the slanted faces may be performed by cutting or the like after a cylindrical mass member is produced. Alternatively, the mass member and the slanted faces can be simultaneously produce by casting or forging. This slanted face can be formed, for example, by imparting a generally unchanging slope angle with respect to the axis of the mass member but varying, preferably gradually, the formation location thereof in the axial direction; or by varying, preferably gradually, the slope angle with respect to the axis of the mass member, in the circumferential direction.

In the present invention, the slanted faces are formed with consideration to the balance of the cylindrical mass member in the circumferential direction. The slanted faces are formed on the two axial end faces of the mass member such that portions intruding deepest inwardly in the axial direction are situated at two areas that are axis-symmetrical to either side of the bore of the mass member, with the axial inward intrusion becoming shallower in stepless fashion moving to either side in the circumferential direction from the deepest intruding portions. The slanted faces are not limited to two locations, and may be disposed at four or more locations, provided that the locations are axis-symmetrical.

In the present invention, by means of providing the mass member with slanted faces in the manner described above, the free length of the elastic support portions of the rubber elastic support members connected at one ends to the slanted faces are made to vary gradually in stepless fashion in the circumferential direction. With this arrangement, it is possible to produce a larger spring ratio in the axis-perpendicular direction, of the portion of the elastic support portion with maximum free length and the portion with minimum free length, whereby it becomes possible to effect tuning of the two different resonance frequencies established for the cylindrical dynamic damper such that these are further apart. When spring constant of the elastic support portion in the axis-perpendicular direction is established on the basis of free length of the elastic support portion, the thickness of the elastic support portion is taken into consideration as well. By disposing a hollow on at least one face selected from the inside peripheral face and the outside peripheral face of the elastic support portion, the spring constant established for the elastic support portion can be adjusted appropriately.

In the present invention, the rubber elastic support members are vulcanization molded together with the mass member having been positioned in the prescribed location within the forming mold, and are thereby formed integrally affixed to the mass member. During this process, since one end of the elastic support portion of the rubber elastic support member is connected to the slanted face of gradually varying shape in the circumferential of the mass member, it is necessary to position the mass member and the elastic support members in the direction of rotation. Thus, not only does it become possible to facilitate the molding operation by disposing on the mass member a mating recess used to position the mass member in the direction of rotation when it is positioned within the mold, but also the occurrence of defective products can be reduced.

This mating recess can be provided by forming a notch at one or several locations on the support face of the mass member, or by forming double flats.

According to the cylindrical dynamic damper of the invention, the mass member has a slanted face of gradually varying shape in the circumferential direction with a chamfered profile on the inside peripheral corner of each axial end, and the elastic support portion connected at one end to the slanted face has free length that varies in the circumferential direction, whereby the damper can be tuned to two different frequencies that are further apart, and durability can be advantageously improved.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
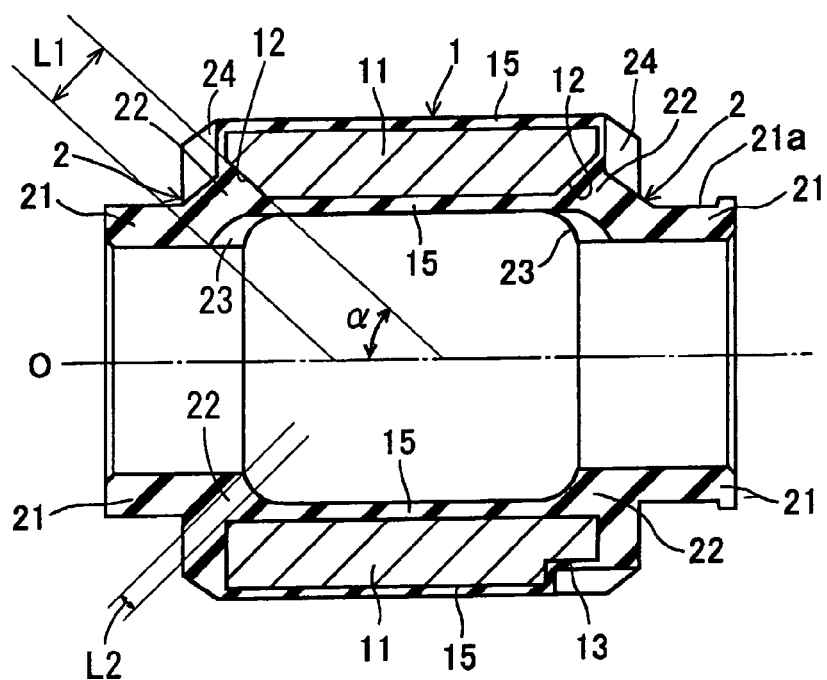
FIG. 1 is an axial cross sectional view of a cylindrical dynamic damper of construction according to a first embodiment of the present invention, taken along line 1-1 of FIG. 1.
Figure 2:
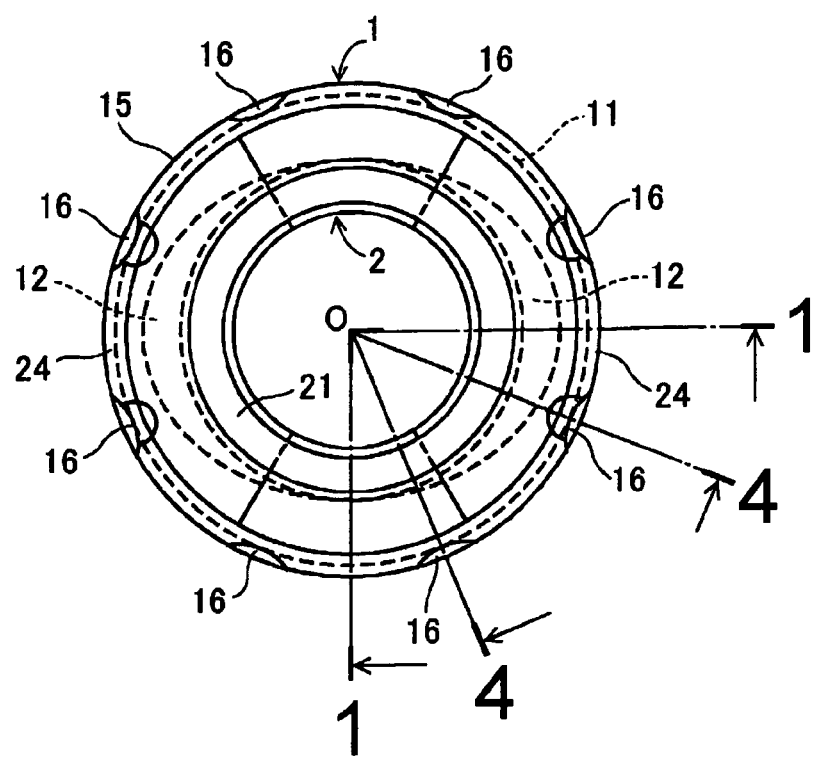
FIG. 2 is a left side view of the cylindrical dynamic damper of FIG. 1.
Figure 3:
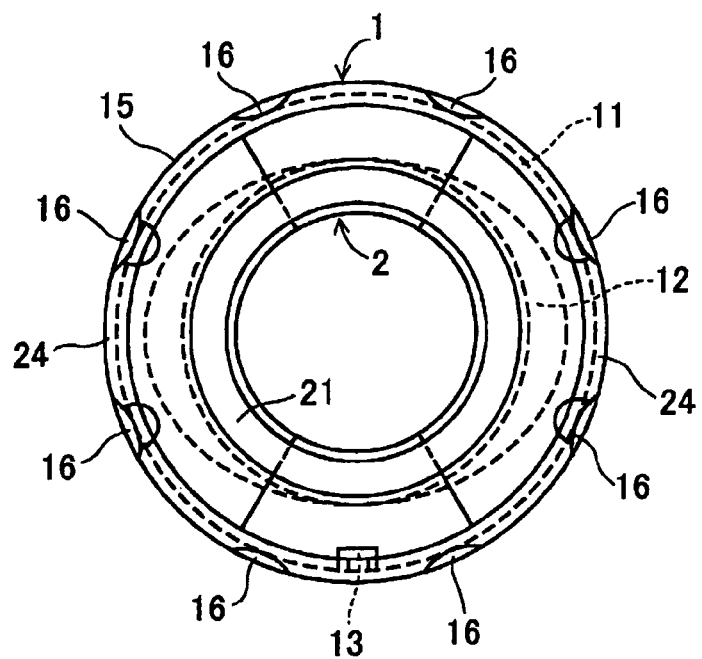
FIG. 3 is a right side view of the cylindrical dynamic damper of FIG. 1.
Figure 4:
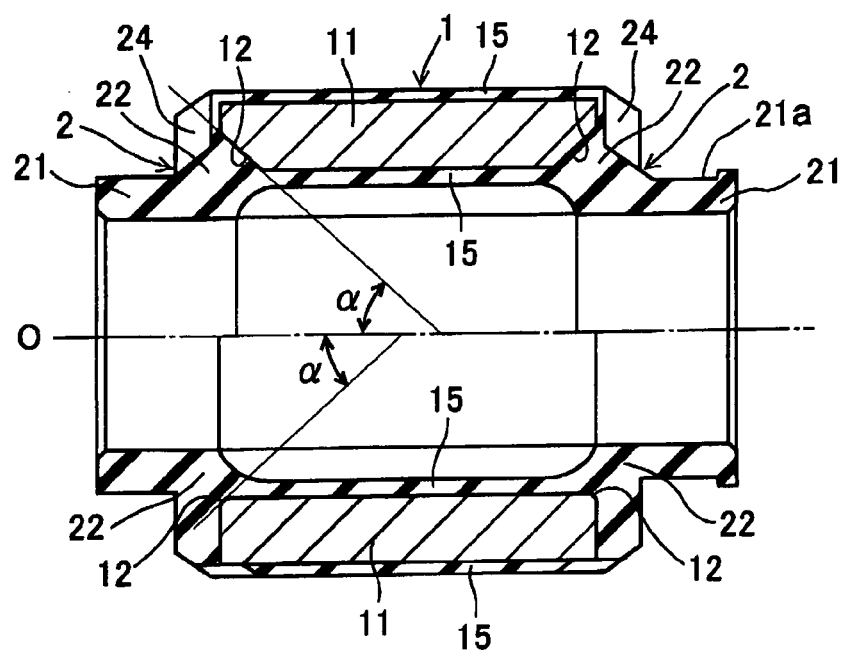
FIG. 4 is an axial cross sectional view of the cylindrical dynamic damper of FIG. 1, taken along line 4-O-4 of FIG. 2.

FIG. 1 is a cross sectional view of a cylindrical dynamic damper according to a first embodiment, taken along the axial direction thereof, the cross section being viewed in the direction of lines 1-O-1 in FIG. 2; FIG. 2 is a left side view of the cylindrical dynamic damper; FIG. 3 is a right side view of the cylindrical dynamic damper; and FIG. 4 is a sectional view of the cylindrical dynamic damper of the embodiment, taken along the axial direction thereof, the cross section being viewed in the direction of lines 4-O-4 in FIG. 2.

As depicted in FIGS. 1-3, the cylindrical dynamic damper of this embodiment comprises: a cylindrical mass member 1 disposed spaced a distance apart from the outside peripheral side of a rotating shaft (not shown) and coaxially therewith; a pair of rubber elastic support members 2, 2 having a pair of ring-shaped affixing members 21, 21 situated at the axial ends of the mass member 1 and mounted on the outside peripheral face of the rotating shaft; a pair of elastic support portions 22, 22 of tapered cylindrical shape connecting respectively to the affixing members 21, 21 and to the axial ends of the mass member 1 to elastically support the mass member 1.

The mass member 1 has a prescribed mass and comprises a mass body 11 of cylindrical shape having substantially unchanging diameter, fabricated of ferric metal having substantially unchanging thickness, and a rubber sheath layer 15 covering the surface of the mass body 11. The mass body 11 has a constant axial length on the outside peripheral portion all the way in the circumference thereof. At the inside peripheral corners at the two axial ends of the mass body 11, slanted faces 12, 12 with a chamfered profile over the end face and inside peripheral face of the mass member 1 are formed with shape varying gradually in the circumferential direction. These slanted faces 12, 12 are formed with a substantially unchanging angle of slope a (45°) with respect to the axis O of the mass member 1, with the forming location of the slanted faces 12, 12 with respect to the axis O being varied gradually in the circumferential direction. That is, the slanted faces 12, 12 are formed on the two axial end faces of the mass body 11, such that portions intruding deepest inwardly in the axial direction are situated at two areas that are axis-symmetrical to either side of the bore of the mass body 11 (in FIG. 2, at the left and right sides), and become shallower in stepless fashion moving to either side in the circumferential direction (the upper and lower sides in FIG. 2) from the deepest intruding portions.

The portions of the slanted faces 12, 12 intruding deepest inwardly in the axial direction are depicted in the upper half of the cross section of FIG. 1. The portions approximately 22.5° forward therefrom in the clockwise direction in FIG. 2 are depicted in the upper half of the cross section of FIG. 4. The portions approximately 45° forward therefrom in the clockwise direction in FIG. 2 are depicted in the lower half of the cross section of FIG. 4. As indicated by the broken lines in FIG. 2 and FIG. 3, the slanted faces 12, 12 formed in this manner have inside peripheral edge shape that is circular and approximately the same size as the inside peripheral shape of the mass body 11, whereas the outside peripheral edge shape is elliptical, and on the minor axis sides, of size approximately the same as the circular shape of the inside peripheral edge.

The rubber sheath layer 15 is formed by means of vulcanization molding of natural rubber or other rubber material, and is vulcanization bonded to the inside peripheral face and the outside peripheral face of the mass body 11 so as to cover these faces entirely. This rubber sheath layer 15 is formed integrally connected to the rubber elastic support members 2 when the rubber elastic support members 2 are formed by vulcanization molding together with the mass body 11. During this process, support pins for supporting the mass member 1 so that it is positioned correctly within the forming mold are disposed in the forming mold for simultaneous vulcanization molding of the rubber sheath layer 15 and the rubber elastic support members 2. The rubber sheath layer 15 is not formed in the areas of the mass body 11 abutted by the support pins, so that recesses 16 corresponding in shape to the shape of the abutting portions of the support pins are formed at several locations (eight in this embodiment). At one location of the outside peripheral portion at one end of the mass body 11, there is disposed a mating recess 13 in the form of a notch.

The rubber elastic support members 2 are formed integrally connected to the rubber sheath layer 15 covering the surfaces of the mass body 11, by means of vulcanization molding of natural rubber or other rubber material with the mass body 11 arranged positioned within a forming mold for vulcanization molding of the rubber elastic support members 2 and the rubber sheath layer 15. The rubber elastic support member 2 comprises a pair of ring-shaped affixing members 21, 21 situated at the axial ends of the mass member 1 and mounted on the outside peripheral face of the rotating shaft by being press-fit thereon. A pair of elastic support portions 22, 22 of tapered cylindrical shape connecting respectively to the affixing members 21, 21 and to the axial ends of the mass member 1 to elastically support the mass member 1. The affixing members 21, 21 have inside diameter slightly smaller than the outside diameter of the rotating shaft, and are pressure-fit against the outside peripheral face of the rotating shaft when mounted onto the rotating shaft. On the outside peripheral face of one of the affixing members 21 is formed a ring-shaped groove 21a within which a fastening band (not shown) is installed after mounting onto the rotating shaft.

The elastic support portions 22, 22 are of tapered cylindrical shape sufficiently thicker than the rubber sheath layer 15, and are connected at the small-diameter end thereof to the affixing members 21, while the large-diameter end thereof is affixed by means of vulcanization bonding to one axial end of the mass body 11. The large-diameter ends of the elastic support portions 22, 22 connect so that the center portion in the thickness direction thereof is situated in proximity to the slanted faces 12, 12 disposed on the inside peripheral corners at the two axial ends of the mass body 11, whereby the mass body 11 is elastically supported at the two axial ends of the mass body 11.

These elastic support portions 22, 22 are designed so that the free length of the portions thereof connecting to the slanted faces 12, 12 vary gradually in the circumferential direction, corresponding to the fact that the slanted faces 12, 12 disposed on the inside peripheral corner at the axial ends of the mass body 11 vary gradually in shape in the circumferential direction. Specifically, the free length of the elastic support portions 22, 22 is at its longest (L1) in the portions where the slanted faces 12, 12 intrude most deeply inward in the axial direction (portions depicted in the cross section of the upper half in FIG. 1), and conversely is at its shortest (L2) at locations phase-shifted by 90° to either side in the circumferential direction (one of these locations is depicted in the lower half of FIG. 1). The free length of each of the elastic support portions 22, 22 should be interpreted and measured as follows. At a portion where the slanted face 12 is produced at the axial ends of the mass body 11, the free length of each of the elastic support portions 22, 22 represents a length of a perpendicular line extending between a first line extending along the slanted face 12 of the mass body 11 and a second line extending parallel to the first line while passing through an axially inward inside edge of the affixing members 21 (see L1 in FIG. 1). At a portion where no slanted face is produced at the axial ends of the mass body 11, the free length of each of the elastic support portions 22, 22 represents a length of a perpendicular line extending outward from an inside edge of the mass body 11 at an angle of 45°, i.e., an elastic principal axis of the elastic support portion 22 between a first line extending perpendicular to the elastic principal axis while passing through a peak of the inside edge of the mass body 11 and a second line extending perpendicular to the elastic principal axis while passing through the axially inward inside edge of the affixing members 21 (see L2 in FIG. 1).

On the inside peripheral face and outside peripheral face of the portions where the elastic support portions 22, 22 have their greatest free length, there are formed inside hollows 23, 23 and outside hollows 24, 24 having reduced thickness in these portions, whereby the spring constant of the portions in the axis-perpendicular direction is adjusted to lower level. These inside hollows 23, 23 and outside hollows 24, 24 are disposed in an angular range of about 40° in the circumferential direction about the axis O (see FIG. 2).

Due to the fact that the elastic support portions 22, 22 are designed in the above manner, the cylindrical dynamic damper of this embodiment is tuned to a single target resonance frequency f1 on the low-frequency end (e.g. to low-frequency end resonance frequency of steel wheels), on the basis of the spring constant of the portions of the elastic support portions 22, 22 with the longest free length, and the mass of the mass member 1. Additionally, the damper is also tuned to a single target resonance frequency f2 on the high-frequency end (e.g. to high-frequency end resonance frequency of aluminum wheels) on the basis of the spring constant of the portions of the elastic support portions 22, 22 with the shortest free length and the mass of the mass member 1. Since a largest spring ratio in the axis-perpendicular direction can be established for the portions of largest free length and the portions of smallest free length, the damper can be tuned so that these two resonance frequencies f1 and f2 are farther apart from one another.

Figure 5:
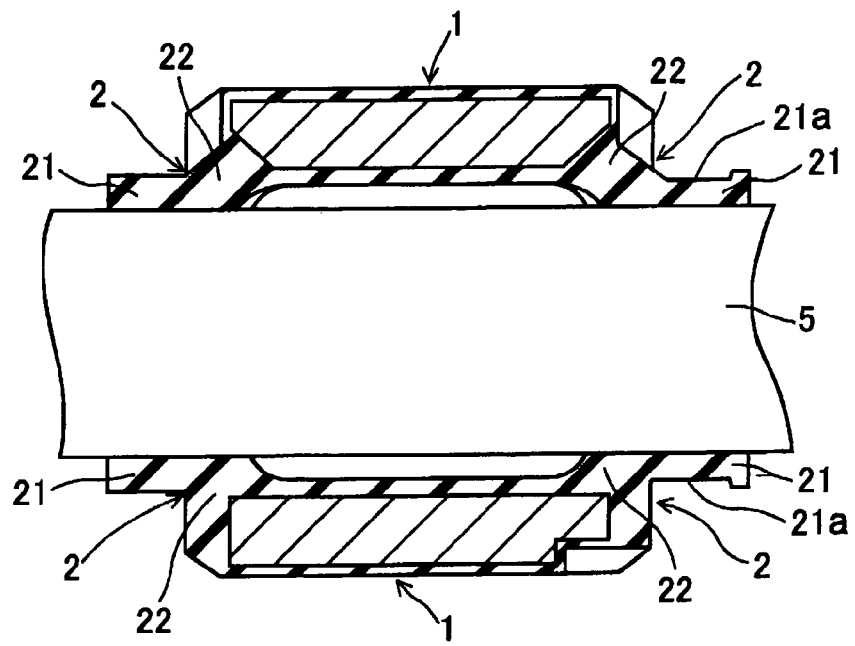
FIG. 5 is an axial cross sectional view of the cylindrical dynamic damper of FIG. 1 being fitted onto a drive shaft.

As depicted in FIG. 5, the cylindrical dynamic damper of this embodiment is press-fit onto an automobile drive shaft or other such rotating shaft 5 using a jig or the like, and mounted thereby onto a prescribed location on the outer peripheral face of the rotating shaft 5 (typically, a location constituting the belly of the axial center portion). It is then affixed securely to the outside peripheral face of the rotating shaft 5 by means of a fastener band (not shown) installed in the groove 21a disposed on one of the affixing members 21 of the rubber elastic support member 2. With this arrangement, the mass member 1, which is positioned spaced a distance apart from the outside peripheral side of the rotating shaft 5 and coaxially therewith, is mounted in a state of being elastically supported on the rotating shaft 5 by the elastic support portions 22, 22 of the pair of rubber elastic support members 2, 2.

If the rotating shaft 5 in association with rotation thereof should give rise to unwanted detrimental vibration such as bending vibration or twisting vibration, and produce vibration of frequency close to the two resonance frequencies f1, f2 to which the cylindrical dynamic damper has been tuned, the mass member 1 will resonate through the agency of elastic deformation of the elastic support portions 22, 22 of the pair of rubber elastic support members 2, 2, whereby the vibrational energy of the rotating shaft 5 will be absorbed, and detrimental vibration produced in the rotating shaft 5 will be effectively suppressed.

At this time, where steel wheels are used for the wheels of the automobile, since the frequency of vibration will be close to the steel wheel resonance frequency f1 to which the damper has been tuned based on the spring constant of the portions of the elastic support portions 22, 22 with the greatest free length, detrimental vibration transmitted to the rotating shaft 5 via the steel wheels will be effectively suppressed by the cylindrical dynamic damper. On the other hand, where aluminum wheels are used for the wheels of the automobile, since the frequency of vibration will be close to the aluminum wheel resonance frequency f2 to which the damper has been tuned based on the spring constant of the portions of the elastic support portions 22, 22 with the shortest free length, detrimental vibration transmitted to the rotating shaft 5 via the steel wheels will be effectively suppressed by the cylindrical dynamic damper.

As will be understood from the foregoing description, the cylindrical dynamic damper of this embodiment has slanted faces 12, 12 that vary gradually in shape in the circumferential direction, disposed on the inside peripheral corners at both axial ends of the mass member 1. The elastic support portions 22, 22 connected at one end to these slanted faces 12, 12 and having free length that varies gradually in the circumferential direction, whereby a largest spring ratio in the axis-perpendicular direction can be established between the portions of the elastic support portions 22, 22 with the greatest free length and the portions with the shortest free length, so that the two different resonance frequencies f1, f2 can be tuned further apart. In this case, since the elastic support portions 22, 22 connect at one end thereof to the slanted faces 12, 12 that vary gradually in shape in the circumferential direction, the free length varies gradually in stepless fashion in the circumferential direction, and can vary very smoothly.

Additionally, in the cylindrical dynamic damper of this embodiment, the inside hollows 23, 23 and outside hollows 24, 24 are disposed on the inside peripheral face and outside peripheral face of the longest free length portions of the elastic support portions 22, 22 connected at one end to the slanted faces 12, 12. With this arrangement, the axis-perpendicular direction spring constant of these portions is adjusted to a low level, making it possible to establish an even greater axis-perpendicular direction spring ratio between portions of greatest free length and portions of smallest free length of the elastic support portions 22, 22, so that the two different resonance frequencies f1, f2 can be tuned even further apart.

Further, in the cylindrical dynamic damper of this embodiment, the axially inward ends of the rubber elastic support members 2, 2, at which stress concentration tends to occur during load input, connect to the slanted faces 12, 12 formed with chamfered profile on the inside peripheral corners at the axial ends of the mass member 1. With this arrangement, stress concentration in the rubber elastic support members 2, 2 is alleviated, preventing the occurrence of cracking or the like, so that durability can be advantageously ensured.

Figure 6:
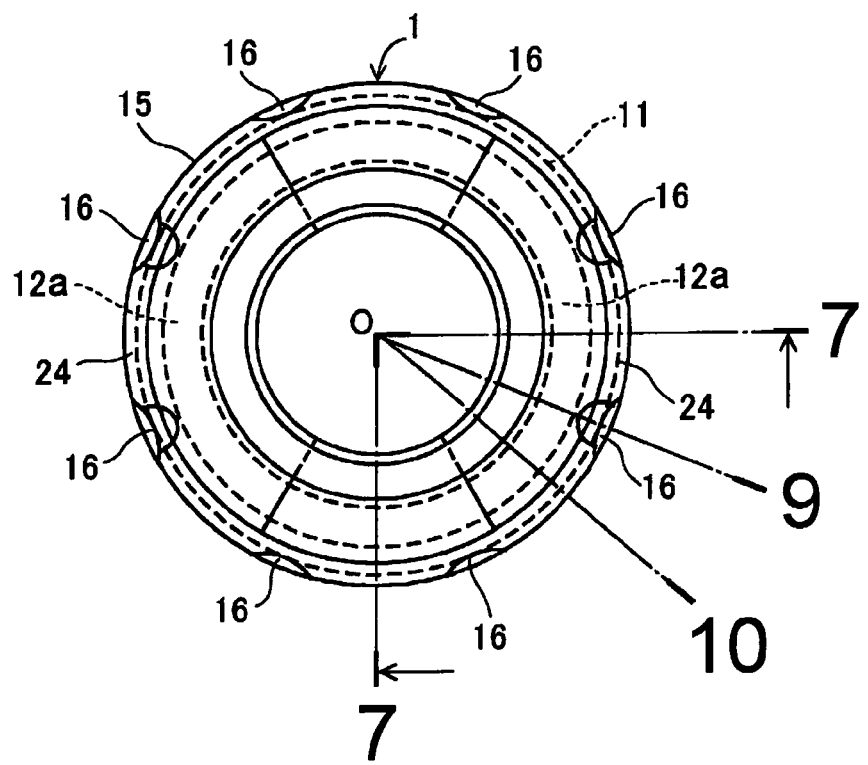
FIG. 6 is a left side view of a cylindrical dynamic damper of construction according to a second embodiment of the invention.
Figure 7:
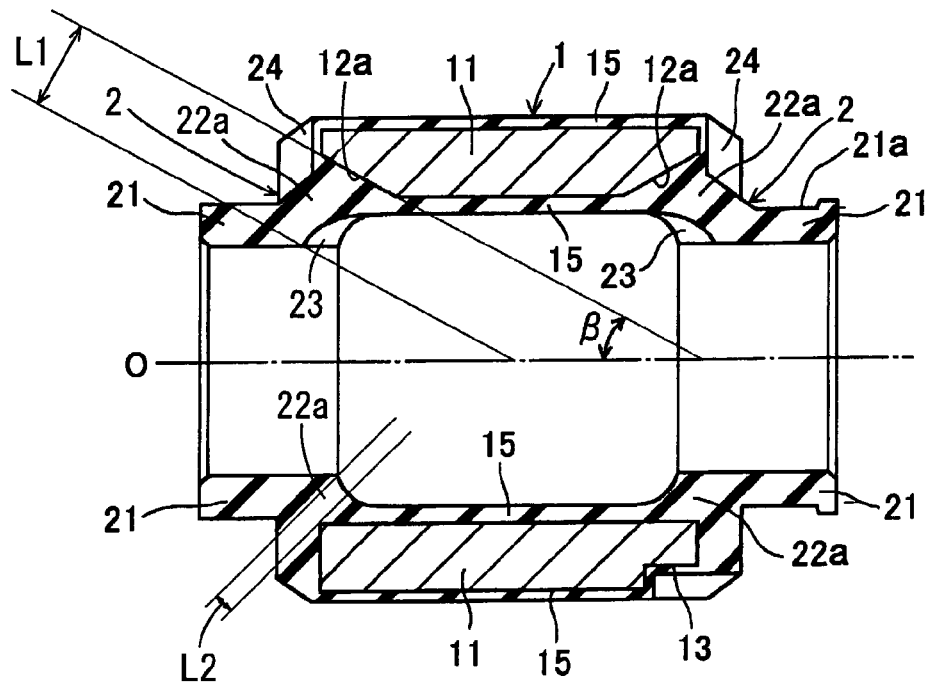
FIG. 7 is an axial cross sectional view of the cylindrical dynamic damper of FIG. 6, taken along line 7-O-7 of FIG. 6.
Figure 8:
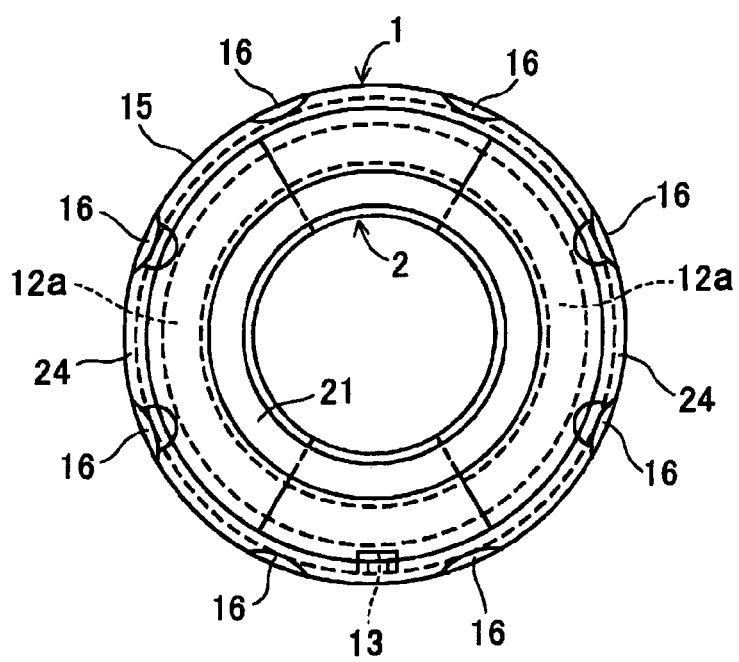
FIG. 8 is a right side view of the cylindrical dynamic damper of FIG. 6.
Figure 9:
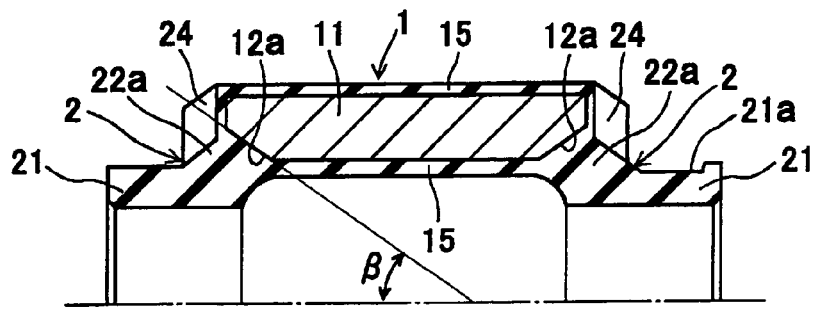
FIG. 9 is an axial cross sectional view of the cylindrical dynamic damper of FIG. 6, taken along line 9-O of FIG. 6.

FIG. 6 is a left side view of the cylindrical dynamic damper pertaining to a second embodiment; FIG. 7 is a cross section viewed in the direction of lines 7-O-7 in FIG. 6; FIG. 8 is a right side view of the cylindrical dynamic damper; FIG. 9 is a cross section viewed in the direction of line 9-O in FIG. 6; and FIG. 10 is a cross section viewed in the direction of line 10-O in FIG. 6.

As depicted in FIG. 6-FIG. 10, the cylindrical dynamic damper of this embodiment comprises: a cylindrical mass member 1 comprising a mass body 11 and a rubber sheath layer 15; and a pair of rubber elastic support members 2, 2 having a pair of ring-shaped affixing members 21, 21 and a pair of tapered cylindrical elastic support portions 22a, 22a. While the basic design is the same as in the first embodiment, the way in which the slanted faces 12a, 12a are disposed on the inside peripheral corners of the axial ends of the mass body 11 is different. Accordingly, component parts and areas in common with the first embodiment will be assigned the same symbols in FIG. 6-FIG. 10 and will not be described in detail, focusing instead on the points of difference in the description hereinbelow.

In this embodiment, the slanted faces 12a, 12a disposed with a chamfered profile over the end face and inside peripheral face of the mass body 11 are formed such that the angle of slope β thereof with respect to the axis O of the mass member 1 varies gradually in the circumferential direction. Specifically, these slanted faces 12a, 12a are formed on the two axial end faces of the mass body 11, by varying the angle of slope β in the circumferential direction with a point of intersection between the slanted faces 12a, 12a and the axial end faces of the mass body 11 fixed. Namely, portions intruding deepest inwardly in the axial direction due to the angle of slope β being at its minimum are situated at two areas that are axis-symmetrical to either side of the bore of the mass body 11 (in FIG. 6, at the left and right sides), with the angle of slope β with respect to the axis O with the end face of the mass body 11 as the origin becoming gradually larger moving to either side in the circumferential direction (the upper and lower sides in FIG. 6) from the deepest intruding portions, whereby the extent of axial inward intrusion becomes gradually shallower in stepless fashion.

Figure 10:
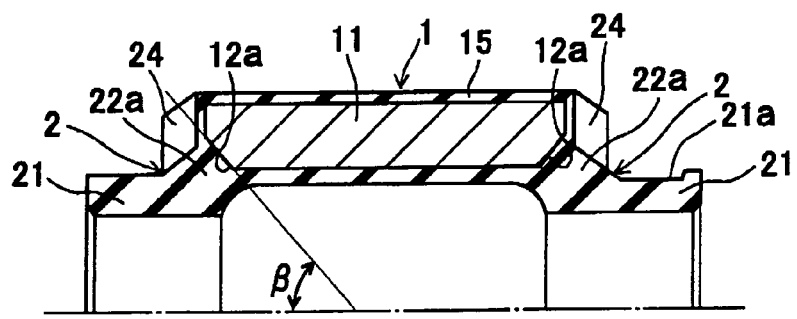
FIG. 10 is an axial cross sectional view of the cylindrical dynamic damper of FIG. 6, taken along line 10-O of FIG. 6.

The portions of the slanted faces 12a, 12a intruding deepest inward in the axial direction are depicted in the upper half of the cross section of FIG. 7; the portions approximately 22.5° forward therefrom in the clockwise direction in FIG. 6 are depicted in cross section in FIG. 9; and the portions approximately 22.5° further forward therefrom in the clockwise direction in FIG. 2 are depicted in cross section in FIG. 10. As indicated by the broken lines in FIG. 6 and FIG. 8, the slanted faces 12a, 12a formed in this manner are formed with arcuate shape extending in the circumferential direction along the inside peripheral face of the mass body 11, with substantially unchanging width which is slightly smaller than the wall thickness of the mass body 11. The slanted faces 12a, 12a are disposed in angular ranges of approximately 120° in the circumferential direction centered on the axis O.

Meanwhile, the elastic support portions 22a, 22a that connect at one end thereof to the slanted faces 12a, 12a disposed on the axial ends of the mass body 11 are designed so that the free length thereof varies gradually in the circumferential direction, corresponding to the fact that the slanted faces 12a, 12a are formed varying gradually in shape in the circumferential direction. Specifically, the free length of the elastic support portions 22a, 22a is at its greatest (L1) in the portions where the slanted faces 12a, 12a intrude most deeply inward in the axial direction (portions depicted in the cross section of the upper half in FIG. 7), and conversely is at its shortest (L2) at locations phase-shifted by 90° to either side in the circumferential direction (one of these locations is depicted in the lower half of FIG. 7).

Like the damper of the first embodiment, the cylindrical dynamic damper of this embodiment having the design described above is tuned to a target resonance frequency f1 on the low-frequency end on the basis of the spring constant of the portions of the elastic support portions 22a, 22a with the longest free length, and the mass of the mass member 1; and is also tuned to a target resonance frequency f2 on the high-frequency end on the basis of the spring constant of the portions of the elastic support portions 22a, 22a with the shortest free length and the mass of the mass member 1. The outstanding operation and advantages of the cylindrical dynamic damper of this embodiment are analogous to those of the first embodiment.

Figure 11:
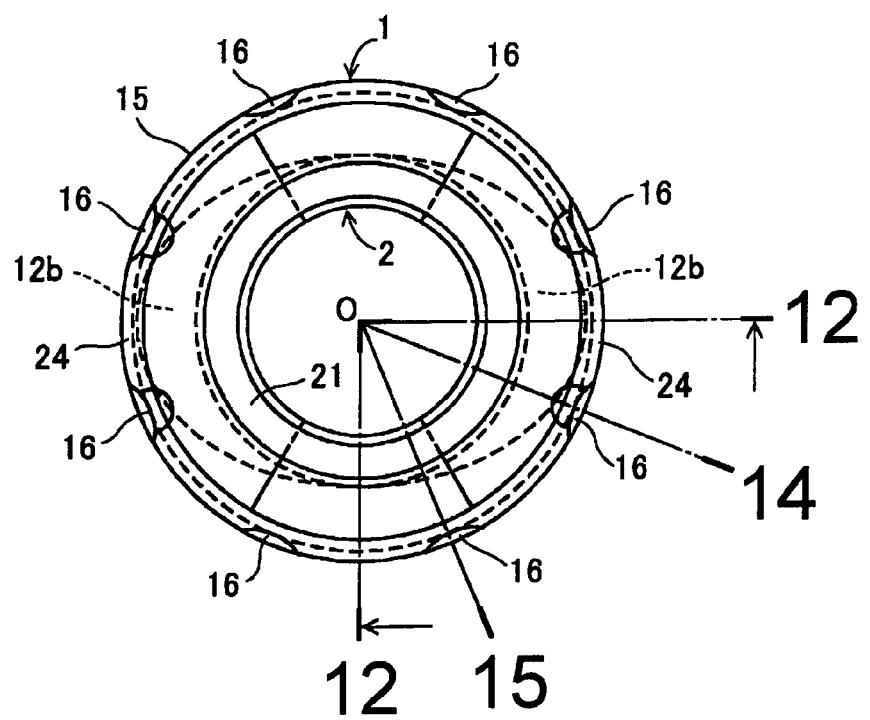
FIG. 11 is a left side view of a cylindrical dynamic damper of construction according to a third embodiment of the invention.
Figure 12:
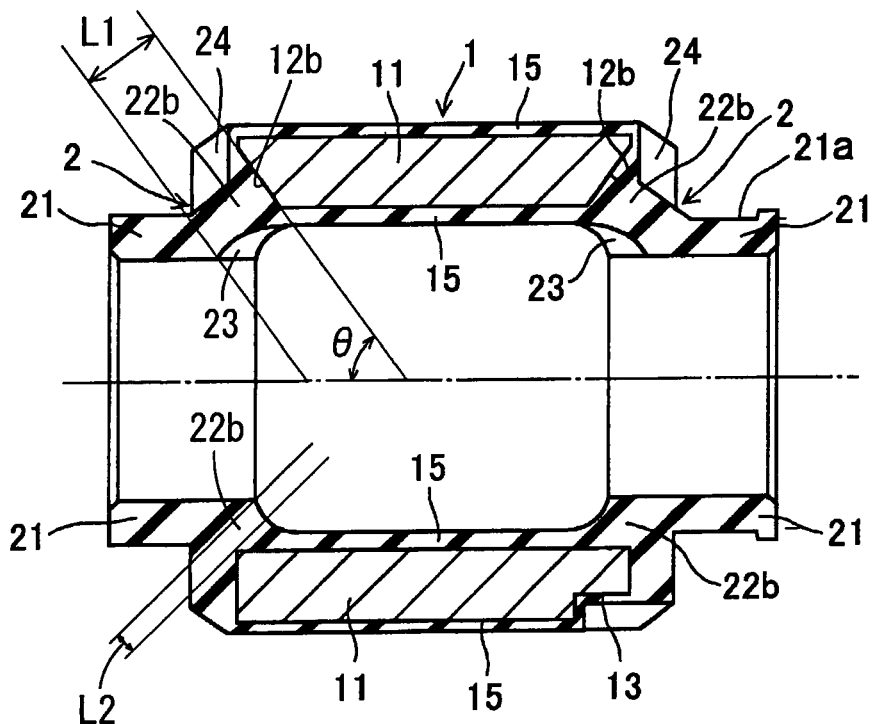
FIG. 12 is an axial cross sectional view of the cylindrical dynamic damper of FIG. 11, taken along line 12-O-12 of FIG. 11.
Figure 13:
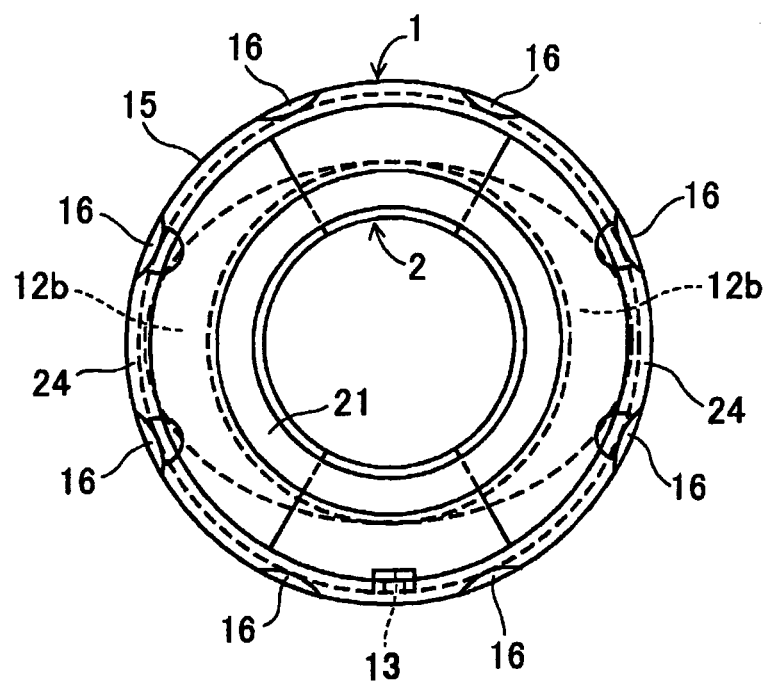
FIG. 13 is a right side view of the cylindrical dynamic damper of FIG. 11.
Figure 14:
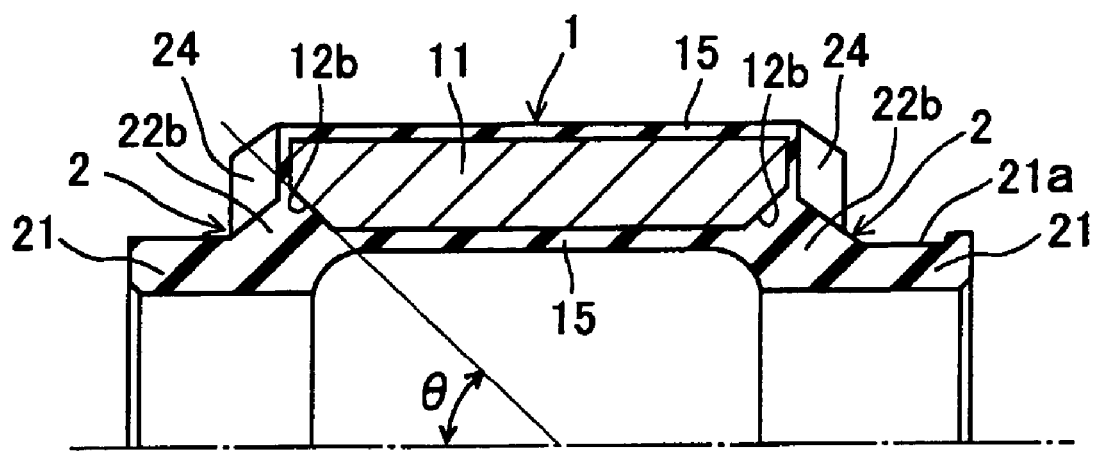
FIG. 14 is an axial cross sectional view of the cylindrical dynamic damper of FIG. 11, taken along line 14-O of FIG. 11.
Figure 15:
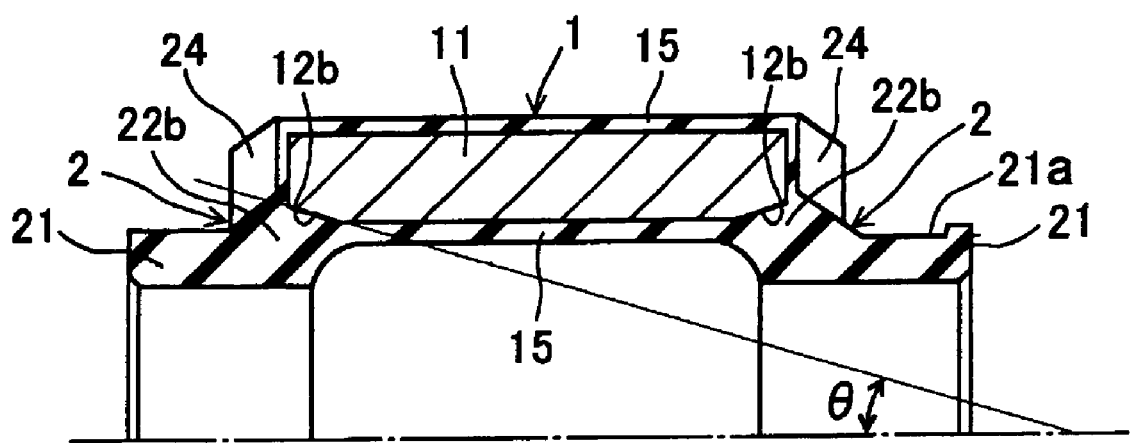
FIG. 15 is an axial cross sectional view of the cylindrical dynamic damper of FIG. 11, taken along line 15-O of FIG. 11.

FIG. 11 is a left side view of the cylindrical dynamic damper of a third embodiment; FIG. 12 is a cross section viewed in the direction of lines 12-O-12 in FIG. 11; FIG. 13 is a right side view of the cylindrical dynamic damper; FIG. 14 is a cross section viewed in the direction of line 14-O in FIG. 11; and FIG. 15 is a cross section viewed in the direction of line 15-O in FIG. 11.

As depicted in FIG. 11-FIG. 15, the cylindrical dynamic damper of this embodiment comprises a cylindrical mass member 1 comprising a mass body 11 and a rubber sheath layer 15; and a pair of rubber elastic support members 2, 2 having a pair of ring-shaped affixing members 21, 21 and a pair of tapered cylindrical elastic support portions 22b, 22b. While the basic design is the same as in the first embodiment, the way in which the slanted faces 12b, 12b are disposed on the inside peripheral corners of the axial ends of the mass body 11 is different. Accordingly, component parts and areas in common with the first embodiment will be assigned the same symbols in FIG. 11-FIG. 15 and will not be described in detail, focusing instead on the points of difference in the description hereinbelow.

In this embodiment, the slanted faces 12b, 12b disposed with a chamfered profile over the end face and inside peripheral face of the mass body 11 are formed by varying the angle of slope θ thereof with respect to the axis O of the mass member 1 in the circumferential direction with a point of intersection between the slanted faces 12a, 12a and an inside circumferential surface of the mass body 11 fixed. Namely, the angle of slope θ varies gradually in the circumferential direction. Specifically, these slanted faces 12b, 12b are formed on the two axial end faces of the mass body 11, such that portions intruding deepest outwardly in the diametrical direction due to the angle of slope θ being at its maximum are situated at two areas that are axis-symmetrical to either side of the bore of the mass body 11 (in FIG. 11, at the left and right sides), with the angle of slope θ with respect to the axis O with the end face of the mass body 11 as the origin becoming gradually smaller, moving to either side in the circumferential direction (the upper and lower sides in FIG. 11) from the deepest intruding portions, whereby the extent of diametrical outward intrusion becomes gradually shallower in stepless fashion.

The portions of the slanted faces 12b, 12b intruding deepest outward in the diametrical direction are depicted in the upper half of the cross section of FIG. 12. The portions approximately 22.5° forward therefrom in the clockwise direction in FIG. 11 are depicted in cross section in FIG. 14; and the portions approximately 22.5° further forward therefrom in the clockwise direction in FIG. 11 are depicted in cross section in FIG. 15. As indicated by the broken lines in FIG. 11 and FIG. 13, the slanted faces 12b, 12b formed in this manner have inside peripheral edge shape that is circular and approximately the same size as the inside peripheral shape of the mass body 11, whereas the outside peripheral edge shape is elliptical, and on the minor axis sides, of size approximately the same as the circular shape of the inside peripheral edge.

Meanwhile, the elastic support portions 22b, 22b that connected at one end thereof to the slanted faces 12b, 12b disposed on the axial ends of the mass body 11 are designed so that the free length thereof varies gradually in the circumferential direction, corresponding to the fact that the slanted faces 12b, 12b are formed varying gradually in shape in the circumferential direction. Specifically, the free length of the elastic support portions 22b, 22b is at its greatest in the portions where the slanted faces 12b, 12b intrude most deeply inward in the axial direction (portions depicted in the cross section of the upper half in FIG. 12), and conversely is at its shortest at locations phase-shifted by 90° to either side in the circumferential direction (one of these locations is depicted in the lower half of FIG. 12).

Like the damper of the first embodiment, the cylindrical dynamic damper of this embodiment having the design described above is tuned to a target resonance frequency f1 on the low-frequency end on the basis of the spring constant of the portions of the elastic support portions 22b, 22b with the longest free length (L1), and the mass of the mass member 1. The cylindrical dynamic damper of this embodiment is also tuned to a target resonance frequency f2 on the high-frequency end on the basis of the spring constant of the portions of the elastic support portions 22b, 22b with the shortest free length (L2) and the mass of the mass member 1. The outstanding operation and advantages of the cylindrical dynamic damper of this embodiment are analogous to those of the first embodiment.

While the present invention has been described in detail in its presently preferred embodiment, for illustrative purpose only, it is to be understood that the invention is by no means limited to the details of the illustrated embodiment, but may be otherwise embodied.

In the illustrated embodiment, the slanted faces 12, 12 vary in shape gradually in stepless fashion in the circumferential direction, it may be possible to vary the shape of the slanted faces 12, 12 in stepwise fashion in the circumferential direction, in order to provide a variety of spring characteristics in three or more axis perpendicular directions.

It is also to be understood that the present invention may be embodied with various changes, modifications and improvements which may occur to those skilled in the art, without departing from the spirit and scope of the invention.

What is claimed is:

1. A cylindrical dynamic damper adapted to be installed on a rotating shaft, comprising:
   a cylindrical mass member disposed radially outwardly spaced away from an outside periphery of the rotating shaft and coaxially therewith; and
   a pair of rubber elastic support members having a pair of ring-shaped affixing members situated at axial ends of the mass member and adapted to be mounted on an outside peripheral face of the rotating shaft and a pair of elastic support portions of cylindrical shape connecting respectively to the affixing members and to the axial ends of the mass member to thereby elastically support the mass member,
   wherein the mass member has on inside peripheral corners of both axial ends slanted faces disposed in chamfered profile and varying in shape in a circumferential direction;
   the elastic support portions connected to the slanted faces have a free length varying in the circumferential direction;
   the slanted faces are formed such that portions of the slanted faces intruding deepest inwardly in an axial direction are situated in radial symmetry about at two areas that are axis-symmetrical to either side of a bore of the mass body; and
   wherein the slanted faces of the mass member vary gradually in shape in the circumferential direction, and the free length of the elastic support portions varies gradually in the circumferential direction.

2. A cylindrical dynamic damper according to claim 1, wherein each of the slanted faces is formed with a generally unchanging slope angle with respect to an axis of the mass member, with a formation location thereof with respect to the axis of the mass member being varied in the axial direction.

3. A cylindrical dynamic damper according to claim 1, wherein each of the slanted faces is formed by varying the slope angle with respect to the axis of the mass member, in the circumferential direction.

4. A cylindrical dynamic damper according to claim 1, further comprising a pair of hollows on at least one face selected from inside peripheral faces and outside peripheral faces of the elastic support portions so as to adjust a spring constant established for the elastic support portions.

5. A cylindrical dynamic damper according to claim 1, wherein on each of the axial ends of the mass member, the slanted face is formed such that portions of the slanted faces intruding deepest inwardly in an axial direction are situated at two areas that are orthogonal in one axis-perpendicular direction of the mass member, and an axial inward intrusion of the slanted face becomes shallower in step less fashion toward either side of the slanted face in the circumferential direction from the portions intruding deepest inwardly, to thereby establish a largest spring ratio in two orthogonal axis-perpendicular directions, between portions of the elastic support members having maximum free length and the portions having minimum free length.

6. A cylindrical dynamic damper adapted to be installed on a rotating shaft, comprising:

a cylindrical mass member disposed radially outwardly spaced away from an outside periphery of the rotating shaft and coaxially therewith; and a pair of rubber elastic support members having a pair of ring-shaped affixing members situated at axial ends of the mass member and adapted to be mounted on an outside peripheral face of the rotating shaft and a pair of elastic support portions of cylindrical shape connecting respectively to the affixing members and to the axial ends of the mass member to thereby elastically support the mass member, wherein the mass member has on inside peripheral corners of both axial ends slanted faces disposed in chamfered profile and varying in shape in a circumferential direction;

the elastic support portions connected to the slanted faces have a free length varying in the circumferential direction;

on each of the axial ends of the mass member, the slanted face is formed such that portions of the slanted faces intruding deepest inwardly in an axial direction are situated at two areas that are orthogonal in one axis-perpendicular direction of the mass member, and an axial inward intrusion of the slanted face becomes shallower in stepless fashion toward either side of the slanted face in the circumferential direction from the portions intruding deepest inwardly, to thereby establish a largest spring ratio in two orthogonal axis-perpendicular directions, between portions of the elastic support members having maximum free length and the portions having minimum free length; and a pair of hollows are formed on the portions of the elastic support members having maximum free length on at least one face selected from inside peripheral faces and outside peripheral faces thereof so as to establish an even greater axis-perpendicular direction spring ratio between the portions of the elastic support members having maximum free length and the portions having minimum free length.

7. A cylindrical dynamic damper according to claim 1, wherein the mass member includes a mating recess used to position the mass member in the circumferential direction upon being positioned within a mold for forming the elastic support members by vulcanization.

* * * * *